United States Patent
Höflich et al.

(10) Patent No.: US 10,807,607 B2
(45) Date of Patent: Oct. 20, 2020

(54) DRIVER ASSISTANCE SYSTEM AND METHOD FOR SUPPORTING A PREDEFINED SERVICE IN A TRANSPORTATION VEHICLE DURING OPERATION

(71) Applicant: VOLKSWAGEN AKTIENGESELLSCHAFT, Wolfsburg (DE)

(72) Inventors: Sebastian Höflich, Lübeck (DE); Volker Römmeler, Lauingen am Elm (DE); Jan Wehinger, Braunschweig (DE)

(73) Assignee: Volkswagen Aktiengesellschaft, Wolfsburg (DE)

(*) Notice: Subject to any disclaimer, the term of this patent is extended or adjusted under 35 U.S.C. 154(b) by 152 days.

(21) Appl. No.: 16/100,341

(22) Filed: Aug. 10, 2018

(65) Prior Publication Data
US 2019/0080333 A1 Mar. 14, 2019

(30) Foreign Application Priority Data
Sep. 8, 2017 (EP) .................................. 17190173

(51) Int. Cl.
*B60W 50/00* (2006.01)
*B60W 30/02* (2012.01)
(Continued)

(52) U.S. Cl.
CPC ......... *B60W 50/0098* (2013.01); *B60P 3/025* (2013.01); *B60W 30/025* (2013.01);
(Continued)

(58) Field of Classification Search
CPC . B60P 3/025; B60W 30/025; B60W 50/0097; B60W 50/0098; B60W 2050/0075; G05D 1/0212
See application file for complete search history.

(56) References Cited

U.S. PATENT DOCUMENTS 4,596,192 A * 6/1986 Forster ...................... B61B 1/02
104/118
6,059,058 A * 5/2000 Dower ................. B62D 65/005
180/65.22
(Continued)

FOREIGN PATENT DOCUMENTS

DE 202015106556 U1 1/2016
DE 102016209099 A1 7/2017

OTHER PUBLICATIONS

Search Report for European Patent Application No. 17190173.9; dated Mar. 22, 2018.

*Primary Examiner* — Donald J Wallace
(74) *Attorney, Agent, or Firm* — Barnes & Thornburg LLP (57) ABSTRACT

A driver assistance system, a computer program product, a signal sequence, a transportation vehicle and a method for assisting provision of a predefined service in a transportation vehicle while the transportation vehicle is traveling on an imminent route. The method includes automatically determining a criterion for the successful provision of the service, determining a driving status and/or a situation of a transportation vehicle which infringe/infringes the criterion on the route, and avoiding the driving status and/or the situation of a transportation vehicle to assist the provision of the service.

22 Claims, 3 Drawing Sheets

(51) Int. Cl.
*G01C 21/34* (2006.01)
*B60P 3/025* (2006.01)
*G05D 1/02* (2020.01)

(52) U.S. Cl.
CPC ..... *B60W 50/0097* (2013.01); *G01C 21/3407* (2013.01); *G05D 1/0212* (2013.01); *B60W 2050/0075* (2013.01); *B60W 2552/00* (2020.02); *B60W 2555/20* (2020.02); *B60W 2556/50* (2020.02); *G05D 2201/0213* (2013.01)

(56) References Cited

U.S. PATENT DOCUMENTS

| | | | |
|---|---|---|---|
| 2009/0164063 | A1 | 6/2009 | Piccinini et al. |
| 2013/0344859 | A1* | 12/2013 | Abramson ........ H04M 1/72577 455/418 |
| 2014/0370167 | A1* | 12/2014 | Garden ................. G08G 1/205 426/233 |
| 2017/0016733 | A1 | 1/2017 | Rolf |
| 2017/0102700 | A1* | 4/2017 | Kozak ................. G05D 1/0061 |
| 2017/0113702 | A1 | 4/2017 | Thieberger-Navon et al. |
| 2019/0056751 | A1* | 2/2019 | Ferguson ................ B60R 21/34 |

* cited by examiner

FIG. 6

DRIVER ASSISTANCE SYSTEM AND METHOD FOR SUPPORTING A PREDEFINED SERVICE IN A TRANSPORTATION VEHICLE DURING OPERATION

PRIORITY CLAIM

This patent application claims priority to European Patent Application No. 17190173.9, filed 8 Sep. 2017, the disclosure of which is incorporated herein by reference in its entirety.

SUMMARY

Illustrative embodiments relate to a driver assistance system, a computer program product, a signal sequence, a transportation vehicle and a method for assisting provision of a predefined service in a transportation vehicle while the transportation vehicle is traveling on an imminent route. Illustrative embodiments also relate to improving or permitting the provision of a service while a transportation vehicle is traveling under critical circumstances.

BRIEF DESCRIPTION OF THE DRAWINGS

Exemplary embodiments are described below in detail with reference to the appended drawings, in which.

DETAILED DESCRIPTION

Private transportation has recently been making rapid advances. On the one hand, communally used modes of transportation (car sharing, pool transportation vehicles etc.) are increasingly in demand and being offered in an evermore professional way. On the other hand, the automation of private passenger transportation is also advancing at an increasing pace, permitting the occupant of such transportation vehicles to make use of their travel time in other ways.

On the other hand, up until now services have usually been offered in stationary facilities (e.g., "commercial premises"). Providers of stationary services have hitherto been faced with the problems that they can only achieve high turnover rates in expensive prime locations, that scaling is difficult, rental contracts tie them long term to one location and the investment costs and the business risk are high.

End customers which wish to experience the service sometimes have to travel long distances and accept high costs for the stationary services. Consequently, the end customer incurs not only traveling time to his place of work but additionally also the time to respective service providers (e.g., restaurant, lawyer, public authority) in his transportation vehicle. At present, a German person spends approximately 60 minutes per day in his car. In addition, many older persons can no longer drive. Autonomous driving makes this possible again.

Depending on the sector, processes are also known in which the service comes to the customer. For example, hairdressing services are offered at home or traveling retail traders (the "egg man") stop by in residential areas to sell goods there.

The provision of services to passengers is already known in isolated cases. For example, gastronomic services can be found in long-distance trains or audiovisual contents ("on-board cinema") can be consumed.

DE 20 2015 106 556 U1 discloses a mobile device for the mobile provision of different services of a modular design, comprising a drive unit, energy storage unit and/or associated electronics. A replaceable service module, which can comprise, for example, a faucet module, a cooling module, an ice module or a wet section is connected to a passenger cell in a reversible state by corresponding locking points.

UBER has started using bicycle couriers to supply food directly to a person's transportation vehicle. It is therefore possible for at least the results of gastronomic services to be enjoyed in conventional transportation vehicles at minimum additional cost. On the other hand, the transportation vehicles themselves are not embodied in a service-specific state. In addition, the service is not provided in the transportation vehicle but rather ends at the transportation vehicle door with the handing over of the food.

The website, www.luxurymobilebarbershop.com, offers a mobile hairdressing salon in which the customer defines the location at which the service is provided (for example, airport car park), and the driver drives the mobile hair salon to the defined destination to provide the service there.

Services which are offered in transportation vehicles already offer on-demand services nowadays, particularly, in the luxury segment. These services provide their end customers with geographical independence, a saving in time and exclusivity, but usually at a cost which is too high for large customer groupings. Services which are offered in transportation vehicles are nowadays usually found in the luxury segment owing to the high investment costs and lack of capacity. The reasons for this are that the transportation vehicle has to be bought for conversion, the conversion involves a large amount of manual work, few standard components are available, the service provider has to travel long distances between his customers, and finally the operative management (payment, booking, taxes) have to be dealt with independently by the service provider. In addition, extensive modifications of transportation vehicles are always associated with costly individual acceptance procedures at the relevant authorities.

Taking the abovementioned prior art as a starting point, the disclosed embodiments permit or improve the provision of services in a mobile service facility while it is traveling.

The disclosed embodiments are based on the basic concept that passengers are basically more prepared to consume than if the same person has to use up freely available time to consume a service.

To adapt the consumption of services better to the requirements of the service provider and the customer while the customer is on the move, the disclosed embodiments are based, for example, on the concept of making available transportation vehicle platforms with all the technical units, such as a chassis, a drive unit, etc. which are necessary for autonomous driving and which can be connected when required to passenger cells which are tailored to the provision of services during travel. The passenger cells are referred to within the scope of the present disclosure as "CABs". "CAB" stands for "cab" or "cabin".

In other words, a CAB is a transportation vehicle superstructure element which is adapted for a specific service or group of services and which makes available all the interfaces to accommodate and operate the equipment which is necessary to provide a service.

The CAB can therefore be understood as being a mechanical unit which can be connected as such to the transportation vehicle platform/the transportation vehicle carrier via predetermined interfaces. The interfaces ensure that there is a mechanically reversible but reliable connection between the CAB and the transportation vehicle carrier. Further interfaces can be configured to transmit energy, in particular, electrical energy, between the CAB and the transportation vehicle carrier. These interfaces are also embodied in a reversible state. Further operating modes (liquids), mechanical energy transmission modes, e.g., shafts, gear wheels, or the like can be provided for transmitting energy mechanically from the transportation vehicle carrier to the CAB, as well as radio links and/or a data connection between the individual CAB and the transportation vehicle carrier as well as their modules. For example, electrical and/or optical lines, in particular, bus systems, are provided as interfaces for all information technology links between the transportation vehicle carrier and the CAB.

To permit a cost-effective, and rapid configuration, which has little susceptibility to faults, of a mobile unit (also referred to "mobile service unit") which is composed of a transportation vehicle carrier and a CAB, there can be provision that all the interfaces between the CAB and the transportation vehicle carrier are arranged in an essentially identical direction corresponding to one another. In other words, a CAB can be engaged mechanically with the transportation vehicle carrier in a first direction, wherein, for example, rails can ensure a positively locking connection between the CAB and transportation vehicle carrier. The same direction can be provided for the energetic connection between the transportation vehicle carrier and the CAB. It can be ensured that a correct mechanical connection between the transportation vehicle carrier and the CAB automatically brings about a correct energetic connection of the transportation vehicle carrier to the CAB. The same can apply to the interfaces for transmitting operating medium. Insofar as data are also exchanged between the CAB and the transportation vehicle carrier (e.g., bidirectionally), it is possible, for example, to arrange, correspondingly, circuit-switched interfaces and to close them automatically when the connection is formed between the transportation vehicle carrier and the CAB. However, this does not rule out a wireless transmission of data between the transportation vehicle carrier and the CAB, for which purpose interfaces can also be provided. It is at least possible to arrange a plurality of interfaces, in particular, standardized interfaces which are essentially the same and are spatially combined and reversible, but protected against undesired disconnection, at corresponding positions on the transportation vehicle carrier/the CAB.

By virtue of the abovementioned standardization, peripheral conditions which are necessary for the provision of services during travel can be provided, which conditions permit a considerable reduction in costs and a hitherto unprecedented degree of individualization of transportation vehicles. While the CABs provide predefined frameworks for the service providers, to offer their service in a reliable and suitable way for the users, the transportation vehicle carrier ensures efficient, comfortable, rapid and time-saving transportation, in particular, in the case of transportation vehicle carriers which are capable of automatic driving. As a result, an individual service is offered to persons who are elderly or unfit to drive as well as children during travel.

The abovementioned concept composed of a transportation vehicle carrier and a CAB permits individualized services to be provided while traveling, wherein the described concept constitutes the physical platform which is made accessible to potential customers in conjunction with a digital intermediary platform (server). The technology which is disclosed here describes the interaction between the individual components and actors in the platform ecosystem. It permits the free time which comes about as a result of the autonomous driving or taxi journeys to be used and monetarized in an optimum way.

Problems of various actors are solved in the platform ecosystem. In this context, it is necessary to differentiate between end customers (using services during travel), service providers (providing services during travel, such as, e.g., lawyers) and microservice providers (making available modules for equipping the transportation vehicles). The modules do not have to be physical or to relate to the physical internal equipment of the CAB but instead could also be software modules, e.g., a presentation of a restaurant menu on a display.

The provision of the mobile service unit composed of the transportation vehicle carrier and CAB can be effected, for example, by a server in conjunction with (mobile) wireless communication terminals ("user terminal") used by the customer/service provider. An application constitutes the interface to the end customer here. The end customer books the mobile on-demand services via the application. To do this, the end user defines the starting point, destination, starting time and type of service to be provided while traveling. End customers can carry out other tasks via the application, such as, e.g., send enquiries, view search results, book mobile service unit/services, issue evaluations and pay for the booked or acquired services.

The service provider can make available a separate profile in digital form, by which the end user can obtain information about the offered services, customer opinions etc. If the user decides to acquire a service, his enquiry is displayed on the user terminal of the mobile service provider or in the transportation vehicle thereof. The service provider can accept the enquiry, as result of which the combined transportation/service contract comes about.

Services which can be provided within the scope of the present disclosure can, for example, be divided up into the following forms/categories:

the service can be provided by a person or in an unmanned state (e.g., a hairdresser as opposed to a multimedia presentation), and     individualized CAB or mass-produced goods (e.g., generic restaurant as opposed to a system-gastronomy business).

In summary, the transportation vehicle architecture on which the present technology is based comprises at least two physical components: the component which is necessary for transportation is referred to as a "transportation vehicle carrier" in which the technology for (autonomous) driving can be located. In addition, the transportation vehicle superstructure (CAB) is used which contains all the interfaces for accommodating and operating the specific equipment which is necessary to provide the service. The transportation vehicles/modes of transportation which are composed of the abovementioned components are also referred to as a "mobile service unit". They can also be referred to as "physical apps on wheels", since they are as versatile in terms of their functional scope as smartphone platforms which are individualized by applications.

The disclosed embodiments solve the abovementioned problem, in particular, using the abovementioned disclosure, by a method for assisting provision of a predefined service in a transportation vehicle while the transportation vehicle is traveling on an imminent route. The imminent route can be defined, for example, by a user's request (e.g., inputting of a destination address) and/or on the basis of a digital entry in a calendar of the user or some other preliminary entry. For this purpose a current position of the user can be defined as a starting point of the imminent route. In a first operation, a criterion for the successful provision of the service is determined automatically. The criterion can make it possible to conclude, for example, that abruptly occurring accelerations (in the X, Y and/or Z directions) would put at risk successful or even safe provision of the service. In some cases, the provision of the service could even be completely prevented by corresponding criteria. The criterion can therefore be transmitted to the user, for example, when the service/mobility service is booked and can be used by the user's user terminal to book a corresponding route.

Alternatively or additionally, the criterion can be used by the mobile service unit and/or the CAB and/or the transportation vehicle carrier and/or a server to calculate, independently of the user terminal, a route for the provision of the combined service (mobility service and a service which is to be additionally provided during travel). For this purpose, a driving status and/or a situation of the transportation vehicle which infringe the criterion on the route are determined. In other words, a calculated route can be examined on the basis of a database to determine whether the components of the route have properties which put at risk or prevent a successful and safe provision of the service or make other conflicts possible. The database can be made available, for example, in a digital form. It can be supplied with updated information about route segments by a service provider and/or by mobile service units. In response to the realization that the criterion for the successful provision of the service would be infringed by the determined route or within the course of driving statuses and/or situations of the transportation vehicle which occur during the route, the driving status and/or the situation of the transportation vehicle is avoided to assist the provision of the service.

In other words, an alternative route or an alternative way of moving the mobile service unit on the route can be selected, with the result that the criterion for the successful provision of the service is not infringed. In this context, for example, a statistical risk of a negative effect on the service can be determined, and in response to a predefined risk level being reached another form of transportation/another route can be selected. Alternatively or additionally, automatic dynamic adaptation of the driving status and/or of the situation of the transportation vehicle can be carried out to avoid infringements of the criterion within the course of the provision of the service. Insofar as this is not ruled out by predefined route criteria, a temporary pause/rest period can be used to avoid a temporary driving status/a temporary situation of the transportation vehicle which would put at risk or prevent the service which is to be provided.

Therefore, a system and a method for calculating a mobile on-demand-service-specific route, that is to say in other words service-specific routing are proposed, as result of which a service is provided with a mobile service unit while the unit is traveling, without the risk of the route segments which are being travelled on or the operating statuses of the mobile service unit which occur in the process having a negative effect on the services which are provided. As a result, there is no risk for successful provision of a service in the transportation/mobile service unit, no risk for the customer and no risk for the service provider.

A core concept of the disclosure is to determine a service which is to be performed during travel, and to take into account automatically the requirements which the provision of the service during travel makes of the transportation and of the other circumstances of the travel, and to ensure that during the travel the service can be provided as well as possible and is adversely effected as little as possible by the simultaneous transportation.

The driving status or the situation of the transportation vehicle can be avoided, for example, by considering and subsequently using an alternative route on which the driving status or the situation of the transportation vehicle do not occur. Alternatively or additionally the transportation vehicle can be controlled with automatically modified or adapted control variables. For example, acceleration/deceleration which exceeds or exceed a predefined limiting value can be avoided. This can imply that the control maintains a relatively large distance from road users in the surroundings in flowing traffic and/or selects relatively low acceleration/deceleration values when traveling through bends and traffic light systems. The transportation vehicle/the transportation vehicle carrier can select suitable shock absorber settings to reduce shocks when services which are sensitive in this regard are provided. Generally, the longitudinal control and/or the transverse control, the engine control, chassis settings and settings of the heating/air-conditioning can be adapted to avoid unsuitable driving statuses and/or situations of the transportation vehicle.

The provision of the service can be detected, for example, by sensor and/or classified. Alternatively or additionally, for example, handling hazardous objects or liquids can be determined, e.g., by a camera using pattern recognition and/or a criterion for the successful provision of the service can be derived automatically. The criteria of the imminent route can be compared automatically with the criterion of the service and, if appropriate, the route or the control of the transportation vehicle can be adapted. Therefore, the service provider can dedicate himself completely to providing the service, while the user can enjoy the service without disruption and to the full.

The situation of the transportation vehicle can be different in nature and can be acquired automatically. For this purpose, transportation vehicle sensors (surroundings sensors, acceleration sensors, inclination sensors etc.) can be used. Alternatively or additionally, digital map material can be used in which corresponding properties which are compatible with the service criterion or not are assigned to certain route segments. An inclination sensor can sense, for example, that a predefined maximum inclination of the transportation vehicle for successful provision of the service is exceeded. Generally, the situation of the transportation vehicle can take into account the surroundings of the transportation vehicle and availability of a communication infrastructure. Furthermore, noise emissions, light emissions and heat emissions along the route lying ahead can be determined and compared with the criterion for the successful provision of a service. Air humidity, precipitation, slipperiness of the road surface and emissions of pollutants along the route can also be communicated, for example, wirelessly, to the transportation vehicle and evaluated by it, as described above. Alternatively or additionally, surroundings sensors, carried along in the transportation vehicle, can be used to determine the abovementioned circumstances. Alternatively or additionally, corresponding information can be stored in a digital data memory as a function of the time of day, the time of year or the day of the week and used to optimize the provision of the service.

A reliable and extensive information base/database can be determined for the successful provision of the service by virtue of the fact that a transportation vehicle fleet which is embodied according to the disclosure determines knowledge relating to conflicts between a criterion for the provision of a service and a criterion of a driving status/of a situation of the transportation vehicle during provision of the service and makes available this information for use by other transportation vehicles. For this purpose, the first transportation vehicle can send a wireless signal in which the circumstances/criteria on which the conflict is based are specified. A second transportation vehicle can receive the signal, e.g., directly, or communicated by a server or by third-party transportation vehicles and can use the signal to avoid the conflict during the provision of a similar or identical service. The location/the time/the day of the week can be assigned to the signals relating to this, to be able to use the knowledge as universally as possible.

The sensor system for determining a route criterion can be arranged in a transportation vehicle carrier and/or in a CAB. Correspondingly, the information determined by sensor can be exchanged between the transportation vehicle carrier and the CAB via a reversible data communication interface, to adapt the control/navigation of the transportation vehicle and alternatively or additionally modify the provision of the service, briefly suspend it or output a message to a customer/service provider within the CAB that temporary restrictions of the provision of the service are to be expected and increased caution/care is recommended until the criteria for the successful provision of the service are satisfied (better) again by the driving situation/the transportation vehicle status.

The service which is assisted here by suitable transportation vehicle control/routing/situation of a transportation vehicle within the scope of the present service can comprise, for example, making available a telecommunication line. For this purpose, it is possible to make sure, as a route criterion, that sufficient coverage is ensured by a telecommunication infrastructure. Insofar as, e.g., a nail care service or a wellness treatment service are available, it is possible to avoid unexpected or abrupt acceleration to reduce the risk of injury to the person consuming the service and/or to avoid stressing the person. However, qualitative route criteria such as, e.g., the quality of the surroundings, the ambiance of the surroundings or objects in the surroundings can be taken into account in the route planning. For example, during a financial advice session as a service a route through expensive parts of a city may be preferred to a route through areas with social housing. During a conversation about purchasing of real estate or financial planning the route can automatically run past objects of interest or generally objects which express a desirable status/assets (buildings, countryside etc., parts of a city). Alternatively or additionally, the route can have a dynamic profile (e.g., behind an attractive transportation vehicle or next to such a transportation vehicle).

If the service is of a gastronomic nature, unexpected acceleration and abrupt driving maneuvers, bumps in the road, tight bends at relatively high speeds etc. can be avoided, to avoid foodstuffs being spilt or knives and other dangerous objects being thrown around. Unexpected, abrupt acceleration is also to be avoided when providing hair care services/hairdressing services, to avoid injury to the consumer of the service and spillage of hair care products. A multimedia presentation (e.g., telephone call, online gaming or video conference) as service can depend on availability of a minimum level of data network coverage, and this coverage can therefore be ensured as a route criterion by suitable routing. The same applies to a virtual reality presentation, wherein acceleration of the transportation vehicle which does not relate in terms of content to the virtual reality is also to be avoided to avoid the users experiencing motion sickness.

If the criterion for the route/control of transportation vehicle/situation of the transportation vehicle applies merely to a defined phase of the service, the avoidance of the transportation vehicle status can be ensured for the predefined phase of the service without other phases of the service bringing about a restriction of other suitable driving statuses/situations of the transportation vehicle/routes (sections). For example, the preparation of a meal in a suitably configured CAB can make comparatively low requirements of the routing/the driving statuses of the transportation vehicle, while the served meals would inevitably be spilt if there were unsuitable driving maneuvers/bumps in the road. Selectively ensuring corresponding criteria can bring about higher user acceptance of the adaptation of the driving statuses and situations of the transportation vehicle to the requirements of the service.

According to a second disclosed embodiment, a driver assistance system is proposed which comprises a data input, an evaluation unit and a data output. A data input is embodied, for example, as a bus user and/or configured to receive information relating to an imminent/ordered service, and to determine a driving status and/or a situation of the transportation vehicle which appear obvious on the basis of the driving task or the purpose of the journey but infringe/infringes the criterion on the route. For this purpose, the data input can communicate with transportation vehicle-external or transportation vehicle-based data memories via a wireless communication interface, for example. The evaluation unit can be embodied, for example, as an electronic control device, programmable processor, microprocessor or the like. The latter is configured to bring about, via the data output, a situation in which the driving status and/or the driving situation are/is avoided to assist the provision of the service. The data output can also be embodied as a bus user and can alternatively or additionally communicate with a driving robot of the transportation vehicle or instruct the robot. In the simplest case, a re-calculation of the route is brought about which better satisfies the criterion/the precondition for successful provision of the service. Alternatively or additionally, settings of the drive train, of the chassis and/or of the transportation vehicle longitudinal guidance or transportation vehicle transverse guidance can be adapted to satisfy the criterion better. As a result, the driver assistance system implements the features, combinations of features and the benefits of the disclosed method which result therefrom in such a clearly corresponding way that reference will be made to the above statements to avoid repetitions.

According to a third disclosed embodiment, a computer program is proposed which comprises instructions which, when executed on an evaluation unit of a driver assistance system according to the second-disclosed embodiment, cause the driver assistance system to execute the operations of a method according to the first disclosed embodiment. The computer program product can be embodied, for example, as a CD, DVD, USB stick, flash memory, cache, hard disk or the like.

According to a fourth disclosed embodiment, a signal sequence is proposed which represents instructions which, when executed on an evaluation unit of a driver assistance system according to the second-disclosed embodiment, cause the driver assistance system to execute the operations of a method according to the first-disclosed embodiment. With respect to the signal sequence, reference is also made to the above statements in respect of the features, combinations of features and benefits, to avoid repetitions.

According to a fifth disclosed embodiment, a transportation vehicle is proposed which comprises a transportation vehicle carrier and a passenger cell (also referred to "CAB") which is connected reversibly to the transportation vehicle carrier and embodied in a service-specific state. The CAB has service-specific devices which are not contained in other transportation vehicles. In any case the transportation vehicle has a driver assistance system according to the second disclosed embodiment and is alternatively or additionally configured to execute a method according to the first disclosed embodiment.

Figure 1:
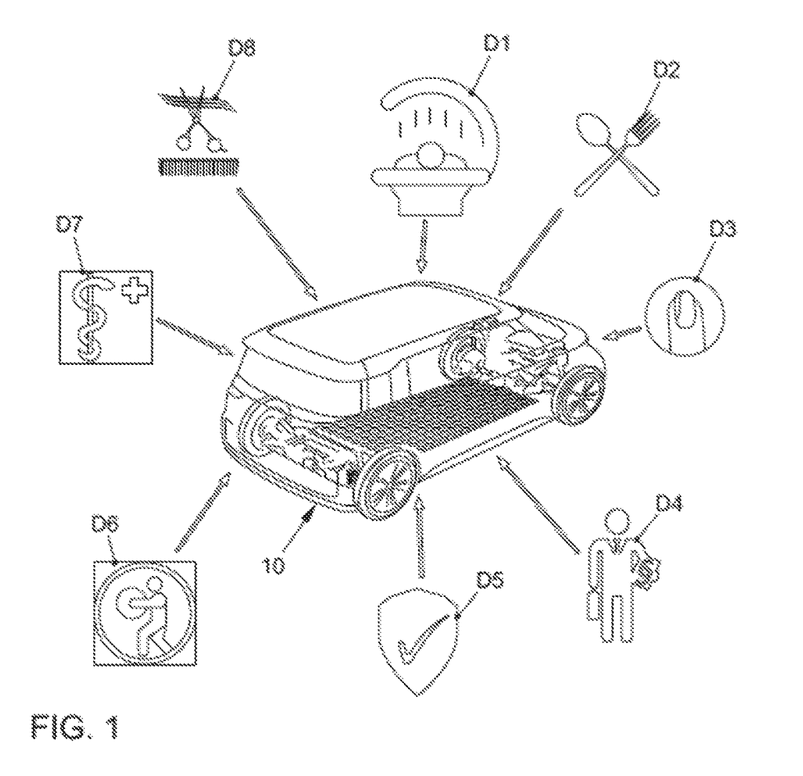
FIG. 1 shows a basic outline illustrating exemplary embodiments of CABs which can be used, in conjunction with a transportation vehicle carrier, to form a disclosed mobile service unit.

FIG. 1 shows a schematic illustration of a transportation vehicle carrier 10 of a mobile service unit according to an exemplary embodiment of the technology disclosed here. The transportation vehicle carrier provides all the features here which are necessary for transportation, in particular, for automatic transportation. The chassis, the drive train, the energy store, the longitudinal/transverse guidance logic and longitudinal/transverse guidance devices, exterior lighting etc. are mentioned only by way of example. Within the scope of the technology disclosed here, CABs (not illustrated) are used to configure specifically the transportation vehicle carrier for the provision of a respective service D1 to D8. For example, an irradiation and/or tanning device D1, such as a CAB, can be connected to the transportation vehicle carrier 10 to be able to offer the "tanning" service. For example, a UV illumination unit and/or a tanning cubicle may be included. To be able to provide gastronomic services D2, a restaurant CAB can be connected to the transportation vehicle carrier 10. The provision of meals and consumption thereof can be made possible by the configuration of the CAB. A cosmetic service or nail care service D3 can require, for example, the CAB to have special workbenches, an extraction system for the rapid exchange of interior air and bright lighting devices (so-called spotlights). For the provision of legal advice services D4 it is possible to provide a library and/or at least two seats in a correspondingly embodied CAB. The same applies to an insurance advice service or financial advice service D5. For this purpose video conferencing hardware and a large screen for presenting graphics and other presentation contents can be provided. Rehabilitation services D6 and medical services D7 can also be assisted as well as possible by the disclosed embodiment/configuration of a respective CAB. For example, examination devices and/or training devices can be components of corresponding CABs. To be able to make available hairdressing services D8, it is possible, for example, to provide a washbasin such as is customary for washing hair in hairdressing salons, a 230 V plug for operating a hair dryer, a large mirror and a height-adjustable hairdressing chair. The abovementioned CABs can be connected in a mechanically secure and crash-proof state to the transportation vehicle carrier 10 by reversible mechanical interfaces. To ensure flows of energy and information between the transportation vehicle carrier 10 and the CAB, reversible interfaces are proposed as illustrated in conjunction with FIG. 3 in detail.

Figure 2:
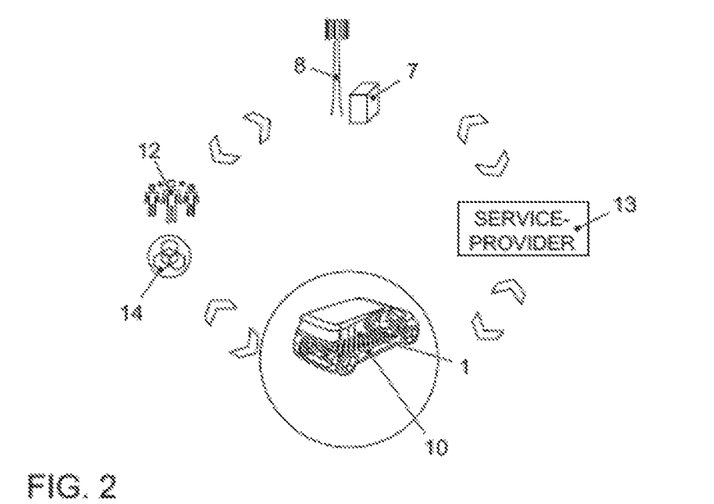
FIG. 2 shows a schematic illustration of a platform ecosystem for illustrating information flows during the implementation of the disclosed technology.

FIG. 2 shows a schematic illustration of a platform ecosystem for illustrating information flows when implementing the technology disclosed here. A micro-service provider 14 individualizes the CABs 1 of the mobile service unit which are subsequently connected to a respective transportation vehicle carrier 10 (temporarily or permanently) and are made available. The provision of the mobile service unit is provided by a service provider 13 which determines, by a server 7 and, for example, a radio tower 8 of a wireless communication network the demand of the users 12 and compares it with the offered mobile service units. The best possible combinations of the offered mobile service unit and interested user 12 give rise to an individual conclusion of a contract for the provision of a mobility service and a CAB-specific service. The micro-service provider 14 can also provide the individual service or a service package to the end customer and for this purpose monitor the operation of the mobile service unit or of the CAB and ensure, or even provide onboard the mobile service unit, a manual service in a manned mobile service unit. Of course, the service provider 14 does not have to be identical to the manufacturer/equipper of the CAB 1. In this respect, different configurations arise with respect to the design, the production and the use of the CABs during the provision of service to the end customer.

Figure 3:
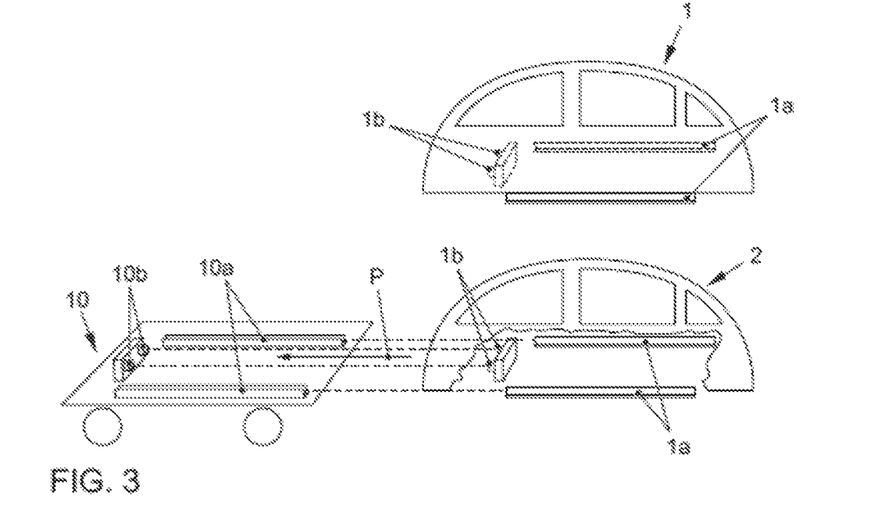
FIG. 3 shows a schematic illustration of a transportation vehicle carrier, of two CABs and of mutual interfaces.

FIG. 3 shows a basic perspective outline of the temporary connection of a transportation vehicle carrier 10 to a first CAB 1 or a second CAB 2. Mechanical interfaces 10a, embodied in a corresponding way to one another, on the transportation vehicle carrier 10 and mechanical interfaces 1a in the CABs 1, 2 ensure there is a rapid and crash-proof connection between the CAB 1, 2 and transportation vehicle carrier 10. If information and/or energy are/is to be exchanged between the CAB 1, 2 and the transportation vehicle carrier 10, or the other way round, additional interfaces 1b, 10b, which correspond to one another, are arranged on the CABs 1, 2 and the transportation vehicle carrier 10 and are likewise engaged with one another in the direction of an arrow P. Alternatively or additionally, further or alternative interfaces between the CABs 1, 2 and the transportation vehicle carrier 10 can be engaged with one another (in the course of the latter) in a corresponding way. For example, a heating/cooling system, hydraulic energy, compressed air, etc. can be exchanged between the CABs 1, 2 and the transportation vehicle carrier 10. The interfaces can be monitored in respect of information technology, with the result that use/travel of the mobile service unit is not permitted until satisfactory contact is formed between the respective interfaces and, in particular, corresponding locking of the interfaces occurs. While the illustrated mechanical interfaces 10a of the transportation vehicle carrier 1 are embodied with U profiles or rail profiles which can be engaged with T profiles (illustrated by way of example) as interfaces 1a of the CABs 1, 2, it goes without saying that other mechanical interfaces which can be engaged with one another if appropriate in a different direction than that of the illustrated arrow P, are possible. However, if the CABs 1, 2 can be mounted on blocks at a suitable height, the transportation vehicle carrier 10 can, as illustrated, drive automatically under the CAB 2, wherein the interfaces 1b, 1a, 10b, 10a are engaged with one another without a costly lifting device or the like being necessary. If appropriate, a pneumatic suspension system of the transportation vehicle carrier 10 can be used to perform minor adjustment of the height. While within the scope of the technology disclosed here a CAB does not necessarily have to be understood as being a passenger cell with service-specific interior equipment, this constitutes a suitable embodiment of the technology disclosed here. Alternatively, the CAB according to the technology disclosed here can constitute a merely temporary component of the passenger cell (fabricated integrally with transportation vehicle carrier 10). With this disclosed embodiment, the interfaces which are illustrated in FIG. 3 (or other suitable interfaces) can be arranged between the CAB and the passenger cell. The interfaces can be arranged, for example, on the roof and/or in the sidewalls and/or in the floor of the CAB and of the passenger cell.

Figure 4:
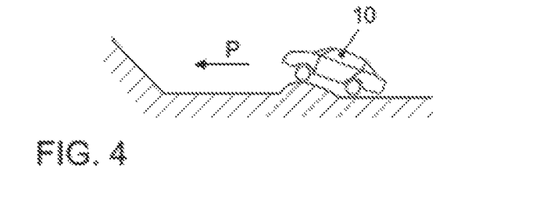
FIG. 4 shows a schematic illustration of a situation of a transportation vehicle/transportation vehicle status which the exemplary embodiments are aimed at avoiding to satisfy a service-specific route criterion.

FIG. 4 shows an exemplary embodiment of a transportation vehicle and has a transportation vehicle carrier 10 which is driving over a bump in the road. To avoid meals and drinks which have been served, for example, in the interior of the CAB (not illustrated separately) from being spilt, the illustrated situation should be avoided, in the same way as travel on the slope which is imminent for the transportation vehicle in the direction of the arrow P. Re-calculation of the route to avoid the illustrated situation of the transportation vehicle can provide a remedy here. If this is not possible or not expedient, within the course of the illustrated situation it is possible to adapt the longitudinal guidance of the transportation vehicle, e.g., to pass over the bump in the road slowly. Alternatively or additionally, at slow speeds the adaptive adaption of the shock absorbers of a pneumatic suspension system and/or of a thread chassis can provide a remedy to a certain extent. However, it is at least possible to output a message to the occupants of the transportation vehicle, by which message they can be requested to be cautious in conjunction with the imminent infringement of the service criterion.

Figure 5:
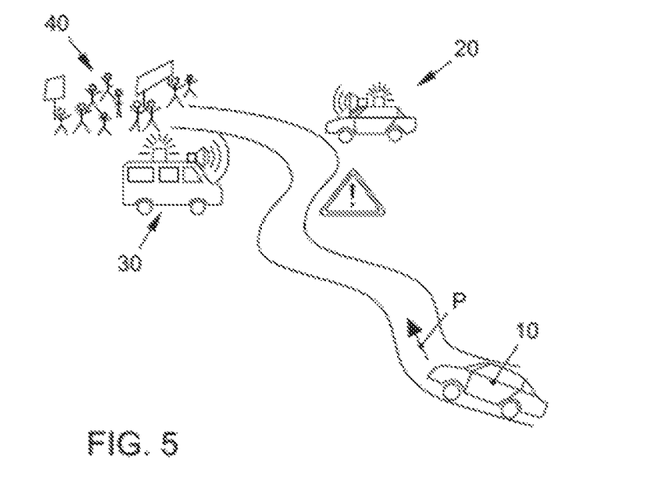
FIG. 5 shows routing of a transportation vehicle, wherein situations which appear unsuitable for individual services (e.g., wellness, romantic dinner) are to be expected along the route.

FIG. 5 shows a section of a route which is to be travelled along by an exemplary embodiment of a transportation vehicle and has a transportation vehicle carrier 10, and along which section of a route unpleasant situations are to be expected from time to time. A police patrol car 20 makes loudspeaker announcements which, as emissions of noise, can adversely effect the comfort of the occupants of the transportation vehicle while the service is being provided. Furthermore, a demonstration march 40 is accompanied by team transportation vehicle 30, as result of which additional noise emissions and intermittent light emissions are to be expected as the imminent section of route is passed along in the direction of the arrow P. Re-calculation of the route can be provide a remedy here and can ensure successful provision of the service (e.g., wellness treatment) during travel.

Figure 6:
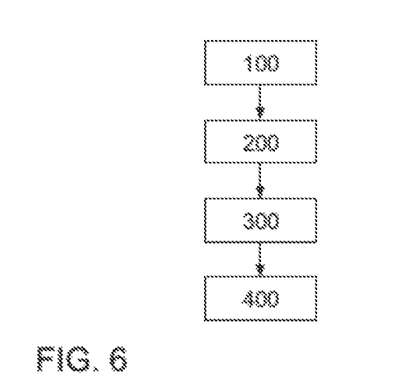
FIG. 6 shows a flow chart illustrating operations of an exemplary embodiment of a disclosed method for assisting provision of a predefined service in a transportation vehicle while the transportation vehicle is traveling.

FIG. 6 shows operations of an exemplary embodiment of a disclosed method for assisting provision of a defined service in a transportation vehicle while the transportation vehicle is traveling on an imminent route. In operation at 100, provision of a service in the transportation vehicle is determined by sensor. For example, it is determined by an optical interior camera within the CAB which is being used that a haircut is being carried out. In operation at 200, a search is carried out in a local database for criteria which are assigned to the service "haircut". Such criterion can be, for example, that any abrupt acceleration above a predefined threshold value is to be avoided and that the service is to be interrupted before the threshold values are exceeded. In this context, different threshold values can be stored for each of the directions of acceleration, with the result that respective limiting values or threshold values are stored as criteria for the three main transportation vehicle directions (X, Y and Z). During the determination of the route which best satisfies the purpose of the journey, independently of the service provided during travel, it is determined that a driving status is to be expected which infringes the criterion. In other words, properties of the initially calculated route are compared with the criteria for the "haircut" service and it is determined that they are not compatible with one another. Therefore, in operation at 400 the problematic driving status is avoided to assist the provision of the service in that a re-calculation of the route is carried out while avoiding those route sections which would otherwise be travelled along during critical phases of the haircut. For example, fingernails can be painted only in the case of very steady travel, while advice on a manicure or the selection of a color would be possible even while traveling over cobblestones.

If the term "determination" of a driving status which infringes the criterion on the route is used within the scope of the present disclosure, it is also to be understood as meaning determination of a sufficient risk or of a critical anticipated value for the negative effect on the provision of the service.

In addition, the determination of the driving status or of the situation of the transportation vehicle is optionally based on car-to-infrastructure (C2X) or car-to-car (C2C) communication and corresponding knowledge. The services can be divided up into service segments which have different requirements of the route segments to be combined in accordance with the purpose of the journey. The useable route segments (route network database) can be enriched, for example, by the totality of the transportation vehicle sensors on the road (in the case of a transportation vehicle fleet) with information about driving statuses or situations of transportation vehicles, with the result that a comprehensive database for the assistance for the provision of a defined service in a transportation vehicle while the transportation vehicle is traveling can be quickly effected. For this purpose, successful provision of the service or problems which occur during the provision of the service owing to the simultaneous driving situations can be logged, in particular, as a function of the respectively provided service. Correspondingly, the way in which criteria which are infringed under certain circumstances are determined on the route can be quickly improved over time.

Within the scope of the present disclosure, the end customer can define the parameters for the provision of a service as well as the parameters for the mobility service (travel from the starting point to the destination, desired departure time, desired arrival time, etc.) independently of one another within the scope of the ordering process. The fact that the abovementioned specifications by the end customers are automatically made compatible with one another permits the service to be provided successfully and therefore in a way which generates maximum customer satisfaction.

LIST OF REFERENCE SYMBOLS 1 first CAB
1a mechanical interface of the CAB
1b technical information/energetic interface of the CAB
2 second CAB
7 server
8 radio tower
10 transportation vehicle carrier 10a mechanical interface of the transportation vehicle carrier
10b energetic/technical information interface of the transportation vehicle carrier
12 user
13 service provider
14 micro-service provider
20 police patrol car
30 team transportation vehicle
40 demonstration march
100-400 method operations
D1-D8 services
P arrow

The invention claimed is:

1. A driver assistance system for assisting provision of a predefined service in a transportation vehicle simultaneously with transportation by the vehicle on an imminent route, the driver assistance system comprising:
 a data input;
 an evaluation unit; and
 a data output,
 wherein the evaluation unit is configured perform the method of:
  providing a database of criteria assigned to predefined services for successful provision of the services;
  determining automatically transportation vehicle control variables, transportation vehicle surroundings along the route and communication infrastructure along the route that infringe/infringes the criteria/criterion assigned to the service on the route in conjunction with the data input; and
  bringing about avoidance of the infringing transportation vehicle control variables, transportation vehicle surroundings along the route and communication infrastructure along the route to assist the provision of the service in conjunction with the data output.

2. The system of claim 1, wherein the avoidance of the infringing transportation vehicle control variables, transportation vehicle surroundings along the route and communication infrastructure along the route comprises:
 using an alternative route and/or controlling the transportation vehicle with automatically modified control variables, including:
  an acceleration, and/or
  shock absorber settings, and/or
  longitudinal guidance and/or transverse guidance, and/or
  engine control, and/or
  chassis setting, and/or
  heating/air conditioning system.

3. The system of claim 1, wherein the system detects the provision of the service in the transportation vehicle by sensor, and automatically determines the criterion of the service.

4. The system of claim 1, wherein the transportation vehicle surroundings and the communication infrastructure include:
 availability of a communication infrastructure,
 noise emissions and/or light emissions and/or thermal emissions and/or
 air humidity and/or emissions as a function of the time of day and/or time of year, along the route.

5. The system of claim 1, wherein the system determines a conflict between a criterion of the service and a criterion of the transportation vehicle control variables, transportation vehicle surroundings along the route and communication infrastructure along the route during provision of a service while a first transportation vehicle is traveling, and transmits a signal representing the conflict to alert a second transportation vehicle to the conflict in response to determining a conflict between a criterion of a service and a transportation vehicle control variables, vehicle surroundings along the route and/or communication infrastructure along the route criterion of during provision of a service while a first transportation vehicle is traveling.

6. The system of claim 5, wherein the transportation vehicle surroundings along the route are determined by a sensor of the transportation vehicle and are transmitted via a data communication interface to a stationary server and/or a passenger cell (CAB) reversibly connected to a transportation vehicle carrier of the transportation vehicle and is embodied in a service-specific state.

7. The system of claim 1, wherein the service requires:
 use of potentially hazardous objects and/or liquids; and/or
 a data communication.

8. The system of claim 1, wherein the service comprises:
 making available a telecommunication line; and/or
 a nail care service, and/or
 a wellness treatment, and/or
 a financial advice and/or insurance advice service, and/or
 a service of a gastronomic nature, and/or
 a private tuition service, and/or
 a real estate service, and/or
 a legal advice service, and/or
 a city administration service, and/or
 a coaching service, and/or
 a field service, and/or
 a hairdressing service, and/or
 a multimedia presentation, and/or
 offering and/or sales of goods, and/or
 production of 3D printed products, and/or
 virtual reality presentations.

9. The system of claim 1, wherein the criterion applies only to a predefined phase of the service and the avoidance of the infringing transportation vehicle control variables, transportation vehicle surroundings along the route and communication infrastructure along the route to assist the provision of the service occurs only for the predefined phase of the service.

10. The system of claim 1, wherein the service is divided in advance into phases, to which respective criteria which are at least proportionally different from one another are assigned.

11. A method for assisting provision of a predefined service in a transportation vehicle simultaneously with transportation by the transportation vehicle on an imminent route, the method comprising:
 providing a database of criteria assigned to predefined services for successful provision of the services;
 determining automatically transportation vehicle control variables, transportation vehicle surroundings along the route and communication infrastructure along the route that infringe/infringes the criteria/criterion assigned to the service on the route; and
 bringing about avoidance of the infringing transportation vehicle control variables, transportation vehicle surroundings along the route and communication infrastructure along the route to assist the provision of the service.

12. The method of claim 11, wherein the avoidance of the infringing transportation vehicle control variables, transportation vehicle surroundings along the route and communication infrastructure along the route comprises:

using an alternative route and/or controlling the transportation vehicle with automatically modified control variables, including:
an acceleration, and/or
shock absorber settings, and/or
longitudinal guidance and/or transverse guidance, and/or
engine control, and/or
chassis setting, and/or
heating/air conditioning system.

13. The method of claim 11, further comprising:
detecting the provision of a service in the transportation vehicle by a sensor; and
automatically determining the criterion of the service.

14. The method of claim 11, wherein the vehicle surroundings and the communication infrastructure include:
availability of a communication infrastructure,
noise emissions and/or light emissions and/or
thermal emissions and/or
air humidity and/or emissions as a function of the time of day and/or time of year, along the route.

15. The method of claim 11, further comprising:
determining a conflict between a criterion of a service and a criterion of transportation vehicle control variables, transportation vehicle surroundings along the route and communication infrastructure along the route during provision of a service while a first transportation vehicle is traveling, and
transmitting a signal representing the conflict to alert a second transportation vehicle to the conflict in response to determining a conflict between a criterion of a service and a criterion of transportation vehicle control variables, transportation vehicle surroundings along the route and communication infrastructure along the route during provision of a service while a first transportation vehicle is traveling.

16. The method of claim 15, wherein the transportation vehicle surroundings along the route are determined by a sensor of the transportation vehicle and mare transmitted via a data communication interface to a stationary server and/or a passenger cell (CAB) reversibly connected to a transportation vehicle carrier of the transportation vehicle and is embodied in a service-specific state.

17. The method of claim 11, wherein the service requires:
use of potentially hazardous objects and/or liquids; and/or
a data communication.

18. The method of claim 11, wherein the service comprises:
making available a telecommunication line; and/or
a nail care service, and/or
a wellness treatment, and/or
a financial advice and/or insurance advice service, and/or
a service of a gastronomic nature, and/or
a private tuition service, and/or
a real estate service, and/or
a legal advice service, and/or
a city administration service, and/or
a coaching service, and/or
a field service, and/or
a hairdressing service, and/or
a multimedia presentation, and/or
offering and/or sales of goods, and/or
production of 3D printed products, and/or
virtual reality presentations.

19. The method of claim 11, wherein the criterion applies only to a predefined phase of the service and the avoidance of the infringing transportation vehicle control variables, transportation vehicle surroundings along the route and communication infrastructure along the route to assist the provision of the service occurs only for the predefined phase of the service.

20. The method of claim 11, wherein the service is divided in advance into phases, to which respective criteria which are at least proportionally different from one another are assigned.

21. A transportation vehicle comprising:
a transportation vehicle carrier; and
a passenger cell reversibly connected to the transportation vehicle carrier embodied in a service-specific state, wherein the transportation vehicle includes the driver assistance system of claim 1.

22. A non-transitory computer-readable medium on which is stored computer code, which when executed on one or more processors causes cause a driver assistance system to execute a method for assisting provision of a predefined service in a transportation vehicle simultaneously with transportation by the vehicle is on an imminent route when the method is executed on an evaluation unit of a driver assistance system, the method comprising:
automatically determining a criterion for the successful provision of the service based on a database of criteria assigned to predefined services for successful provision of the services;
determining a transportation vehicle control variables, transportation vehicle surroundings along the route and communication infrastructure along the route that infringe/infringes the criterion assigned to the service on the route; and
bringing about avoidance of the infringing transportation vehicle control variables, transportation vehicle surroundings along the route and communication infrastructure along the route to assist the provision of the service.

* * * * *